United States Patent

[11] 3,572,761

| [72] | Inventors | David Robert Frederick Tapp<br>Haslemere;<br>Geoffrey Edward Ernest Tapp, Farnham, Surrey, England |
|---|---|---|
| [21] | Appl. No. | 807,819 |
| [22] | Filed | Mar. 17, 1969 |
| [45] | Patented | Mar. 30, 1971 |
| [32] | Priority | Mar. 20, 1968 |
| [33] | | England |
| [31] | | 13549/68 |

[54] THREE-POINT LINKAGES OF AGRICULTURAL TRACTORS
5 Claims, 3 Drawing Figs.

[52] U.S. Cl. .................................................. 280/461,
172/452, 280/479
[51] Int. Cl. .................................................. B60d 1/00
[50] Field of Search ............................................ 280/461,
460, 479; 172/439, 452

[56] References Cited
UNITED STATES PATENTS
3,031,208 4/1962 Abbott .......................... 280/467X

| 3,295,611 | 1/1967 | Bunting et al. | 280/460(.1)X |
| 3,421,779 | 1/1969 | Shelby | 280/479 |
| 3,432,184 | 3/1969 | Tweedy | 280/479 |
| 3,462,172 | 8/1969 | Thor | 280/479 |

FOREIGN PATENTS
| 1,202,655 | 7/1959 | France | 280/461 |

*Primary Examiner*—Leo Friaglia
*Attorney*—Young & Thompson

ABSTRACT: A three-point linkage for an agricultural tractor comprises two spaced draft links pivotally connected to the rear of the tractor and extending rearwardly therefrom, a rearwardly extending top link pivotally connected to the rear of the tractor at a point above and between the draft links, a linkage connecting the draft links to an hydraulically operated mechanism on the tractor which effects raising and lowering of the draft links, and a double-acting hydraulic ram incorporated in the linkage connecting the draft links to the hydraulically operated mechanism, operation of the ram being adapted to raise or lower one draft link relatively to the other in order to adjust the position of an implement carried by the links about a fore-and-aft axis.

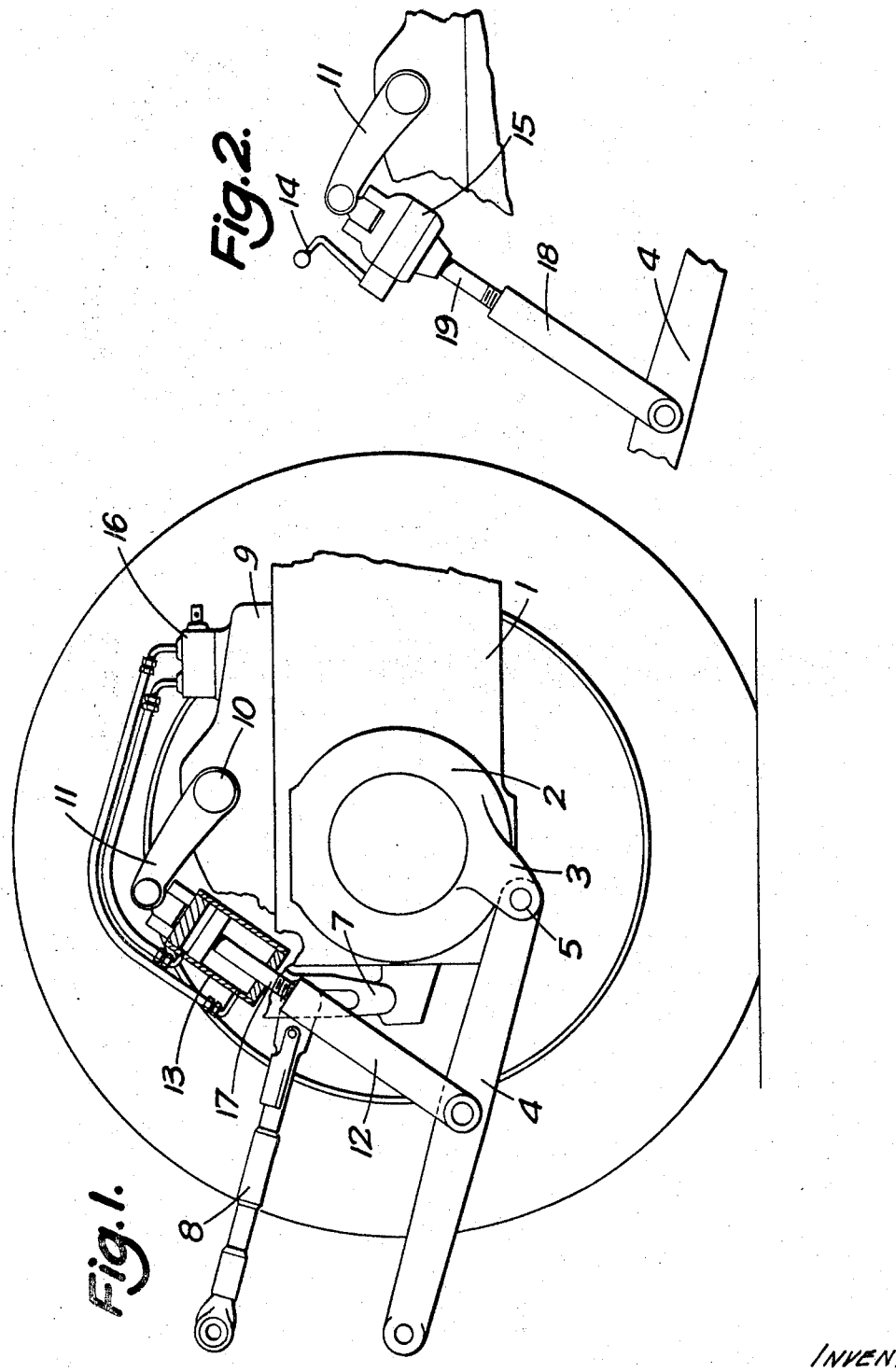

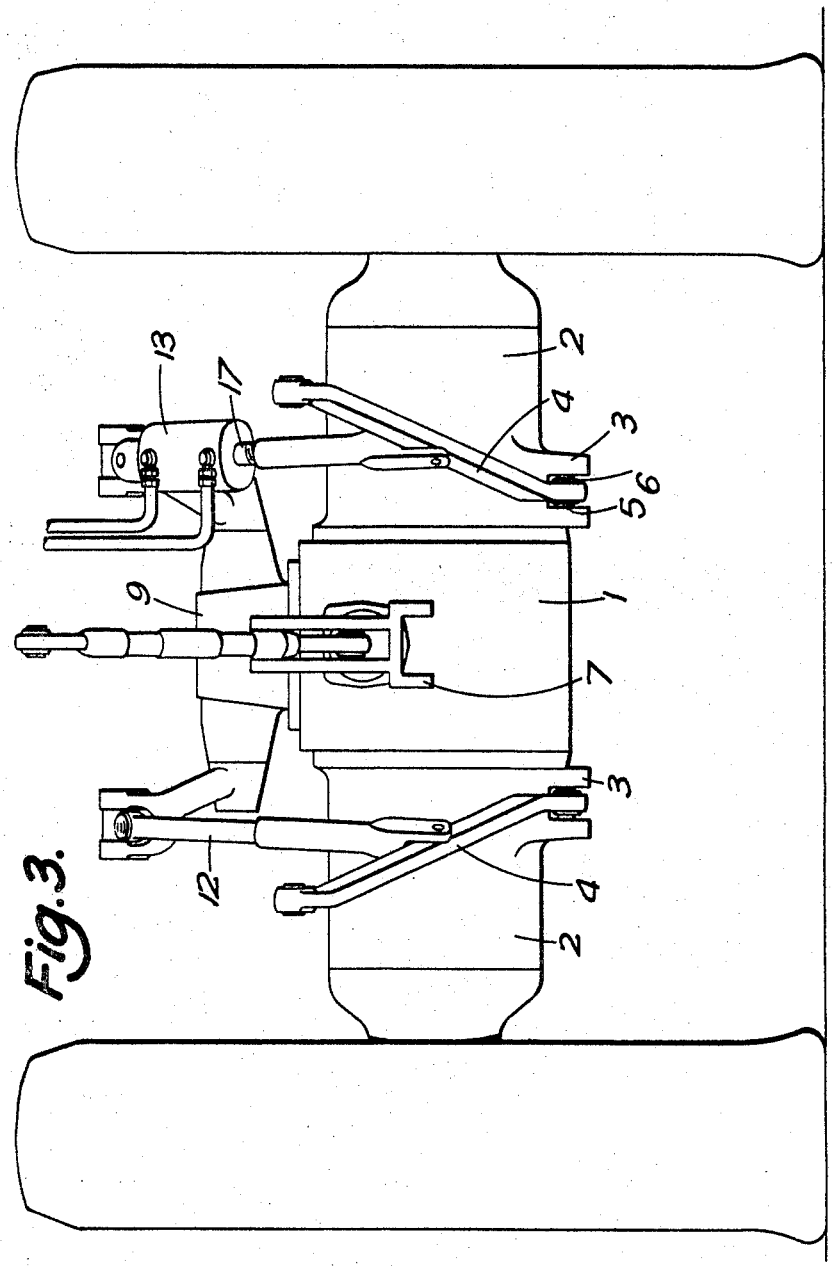

THREE-POINT LINKAGES OF AGRICULTURAL TRACTORS

The invention relates to three-point linkages of agricultural tractors of the kind comprising two spaced draft links adapted to be pivotally connected to the rear of a tractor and extending rearwardly therefrom, a rearwardly extending top link adapted to be pivotally connected to the rear of the tractor at a point above and between the draft links, and a linkage adapted to connect the draft links to an hydraulically operated mechanism on the tractor which effects raising and lowering of the draft links.

In order to adjust the position of an implement carried by the links about a fore-and-aft axis, there are normally provided means for adjusting one of the lower draft links up or down relatively to the other. This is normally accomplished by providing, in a link connecting one draft link to the hydraulically operated mechanism, a link adjuster comprising a threaded rod and tube with a hand wheel geared to the rod. In order to effect this adjustment it is necessary for the tractor driver to turn round bodily and adjust the linkage by turning the hand wheel manually.

According to the invention, in a three-point linkage of the kind first referred to an hydraulic ram is incorporated in the linkage for connecting the draft links to the hydraulically operated mechanism, operation of which ram is adapted to raise or lower one draft link relatively to the other.

Preferably the hydraulic ram is a double-acting ram.

In the case where said hydraulically operated mechanism comprises two parallel arms extending rearwardly of the tractor and adapted to be swung up and down hydraulically, said linkage for connecting the draft links to the hydraulically operated mechanism may comprise two links each adapted to be pivotally connected at its upper end to one of said arms and pivotally connected at its lower end to one of the draft links, the hydraulic ram being incorporated in one of the first said links. The link incorporating the hydraulic ram may also be adjustable in length by means of a manual screw adjustment.

In any of the above arrangements adjustment of the hydraulic ram is preferably effected by operation of an hydraulic control valve adapted to be mounted on the vehicle in a position to be accessible to the driver.

The invention includes within its scope an agricultural tractor incorporating a three-point linkage of any of the kinds referred to above.

The following is a more detailed description of one embodiment of the invention reference being made to the accompanying drawings in which:

FIG. 1 shows a side elevation of a three-point linkage fitted with the hydraulic ram adjustment;

FIG. 2 shows a scrap view of the conventional means of adjustment; and

FIG. 3 shows a rear elevation looking towards the front of the tractor and the three point linkage with the hydraulic leveling ram fitted.

The rear transmission housing 1 of the tractor is attached to rear axle housings 2, integral with which are clevises 3 for the attachment of the lower of the three links 4. The lower links 4 are secured to the clevis 3 by means of pins 5 and ball joints 6. Attached to the rear of the transmission housing 1 is a bracket 7 which forms the mounting for the upper of the three links 8. Attached to the top of the rear transmission housing is a further casing 9 which houses a hydraulic ram and linkage, not shown, for raising and lowering the lower links 4. The linkage operates through shaft 10 and lever 11 to raise and lower the lower links 4. The shaft 11 is connected to the lower link 4 on one side by a fixed link 12 and on the other side by a link incorporating a double-acting hydraulic ram assembly 13. The ram assembly is operated from the tractor hydraulic system and is controlled by an hydraulic control valve 16. This may be operated by a lever on the valve itself, or a lever in any other convenient position may operate the control valve through a mechanical linkage.

In FIG. 2., which shows the conventional method of effecting leveling, the lower link 4 is raised by the lever 11 through an adjustable assembly comprising a threaded tube 18 engaged by threaded rod 19 which may be rotated by means of a hand wheel 14 and a gearbox 15.

In the arrangement of 2, 1 and 3 it will be seen that the link incorporating the hydraulic ram assembly 13 also incorporates a manual screw adjustment as indicated at 17. Such an adjustment is not essential but when it is provided large initial adjustments can be made by adjusting the screw when setting up the implement mounted on the three point linkage, the hydraulic ram being used for final adjustment from the driver's seat.

We claim:

1. A three-point linkage for an agricultural tractor comprising two spaced draft links adapted to be pivotally connected at one end to the rear of the tractor and extending rearwardly therefrom so that a load may be attached to the free ends thereof, a rearwardly extending top link adapted to be pivotally connected to the rear of the tractor at a point above and between the draft links, a linkage adapted to connect the draft links to a hydraulically operated mechanism on the tractor which effects raising and lowering of the draft links, a hydraulic ram incorporated in the linkage for connecting the draft links to the hydraulically operated mechanism, operation of which ram raises and lowers one draft link relative to the other to twist a load carried on the draft links about a fore-and-aft extending axis parallel to the longitudinal axis of the tractor.

2. A three-point linkage according to claim 1 and for use where said hydraulically operated mechanism comprises two parallel arms extending rearwardly of the tractor and adapted to be swung up and down hydraulically, wherein said linkage for connecting the draft links to the hydraulically operated mechanism comprises two links each adapted to be pivotally connected at its upper end to one of said arms and pivotally connected at its lower end to one of the draft links, the hydraulic ram being incorporated in one of the first said links.

3. A three-point linkage according to claim 2, and a manual screw adjustment for adjusting in length the link incorporating the hydraulic ram.

4. An agricultural tractor having: two spaced draft links pivotally connected at one end to the rear of the tractor and extending rearwardly therefrom to enable a load to be carried on the free ends of the links; a rearwardly extending top link pivotally connected to the rear of the tractor at a point above and between the draft links; a hydraulically operated mechanism on the tractor which effects raising and lowering of the draft links; a linkage connecting the draft links to the hydraulically operated mechanism; and a hydraulic ram incorporated in the linkage connecting the draft links to the hydraulically operated mechanism operation of which ram raises and lowers one draft link relative to the other, to twist a load carried on the draft links about a fore-and-aft extending axis parallel to the longitudinal axis of the tractor.

5. An agricultural tractor according to claim 4 wherein said hydraulically operated mechanism comprises two parallel arms extending rearwardly of the tractor and adapted to be swung up and down hydraulically, and said linkage comprises two links each pivotally connected at its upper end to one of said arms and at its lower end to one of the draft links, the hydraulic ram being incorporated in one of said two links.